May 1, 1951          J. ROSAN          2,550,866

TOOL FOR INSTALLING INSERTS

Filed May 11, 1946          2 Sheets-Sheet 1

JOSEPH ROSAN,
INVENTOR.

BY
ATTORNEY.

May 1, 1951  J. ROSAN  2,550,866
TOOL FOR INSTALLING INSERTS
Filed May 11, 1946  2 Sheets-Sheet 2
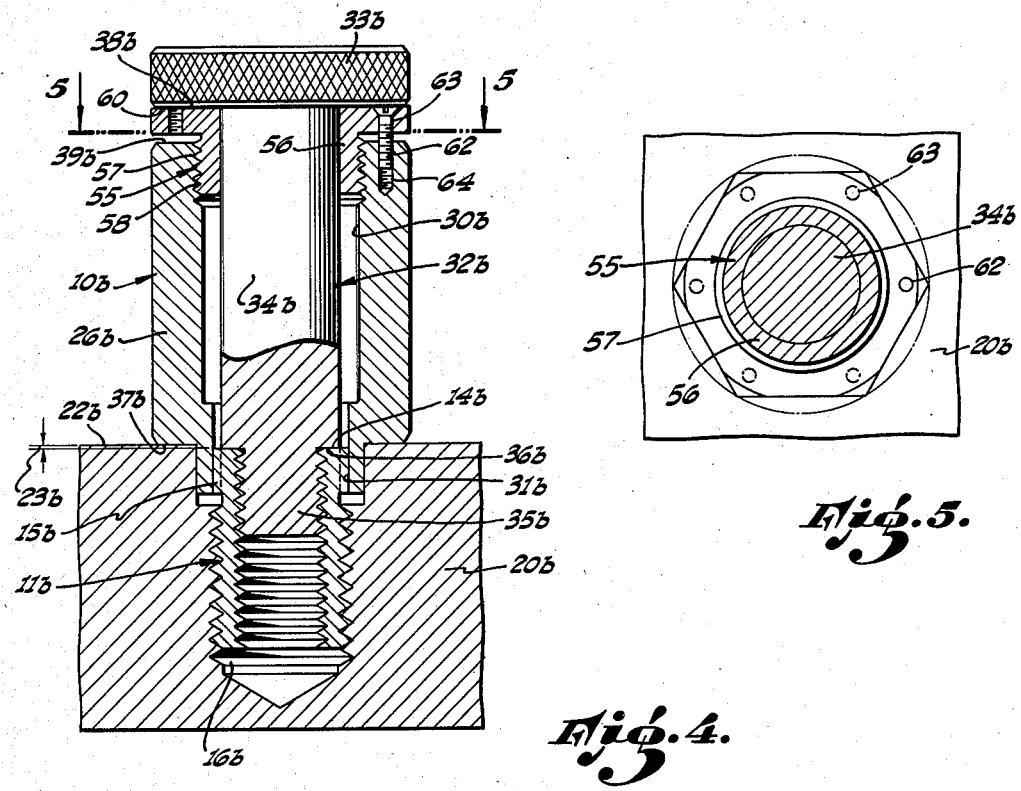
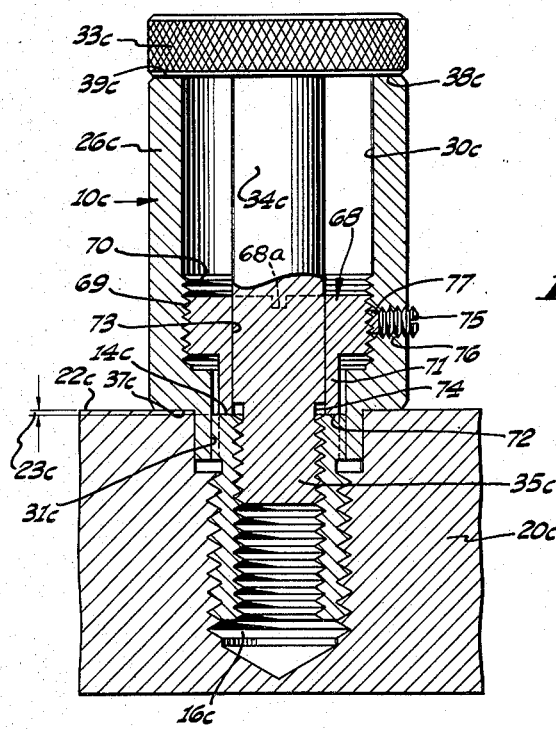
JOSEPH ROSAN,
INVENTOR.
ATTORNEY.

Patented May 1, 1951

2,550,866

UNITED STATES PATENT OFFICE 2,550,866

TOOL FOR INSTALLING INSERTS

Joseph Rosan, North Hollywood, Calif.

Application May 11, 1946, Serial No. 669,059

9 Claims. (Cl. 81—53)

The present invention relates to a new and improved means and method for installing threaded inserts or studs of the type shown and described in my United States Patent No. 2,400,318, granted May 14, 1946, into a parent body of different material, and is more particularly concerned with a tool for inserting such inserts or studs to an exactly predetermined depth with respect to the surface of the parent material.

Inserts of the type referred to are widely used wherever it is necessary to secure screws or bolts to a part made of any material that is soft or otherwise unsuited to have said screws threaded directly into tapped holes in the parent body. Such inserts are usually made of steel and are in the nature of tubular sleeves which are threaded externally and internally. These inserts are screwed into tapped holes in the parent material and then locked in place by means of a locking ring which is serrated on its inside and outside surfaces. The locking ring is driven into place over the insert with its inner serrations coacting with mating serrations on the insert while the outer serrations broach their way into the sides of a counterbore in the parent material to lock the ring and insert against turning. A screw or bolt may thereafter be screwed into the insert which, being of a hard material, is capable of withstanding repeated insertion and removal of the screw or bolt without damage. Studs of the type referred to in my aforesaid patent are like the described inserts, excepting that they comprise externally threaded cylindrical bodies provided with projecting threaded studs. They present the same installation problems as the tubular inserts, and for convenience I will hereinafter refer chiefly to the tubular inserts.

In the installation of these inserts, it is essential that the end of the insert be either flush with or slightly below the surface of the parent material to avoid interference with any parts which may subsequently be drawn up tight against such surface. To insure against any such interference, it is preferable that they be installed below said surface. Accordingly, one of the primary objects of the present invention is the provision of a tool which will enable quick and easy installation of the inserts to a uniform and exact predetermined depth with respect to the surface of the parent material.

Another aspect of the invention relates to the provision of a simple and inexpensive tool having means capable of adjustment for installing the inserts to any desired depth within the limits of the tool.

A further object of the invention has to do with the provision of a tool for installing studs of the type hereinbefore mentioned so that the top end of the serrated collar thereon is located a predetermined distance below the surface of the parent material.

These and other objects and advantages will become apparent to those skilled in the art after consideration of the following detailed description of certain selected typical embodiments thereof, reference being had to the appended drawings, in which:

Fig. 4 is a sectional view taken through another modified form of my invention in which means are provided for varying the depth of the insert;

Fig. 5 is a sectional view, taken along the line 5—5 in Fig. 4; and

Fig. 6 is a sectional view of another embodiment of the invention, showing another arrangement for adjusting the depth of the insert.

Figure 1:
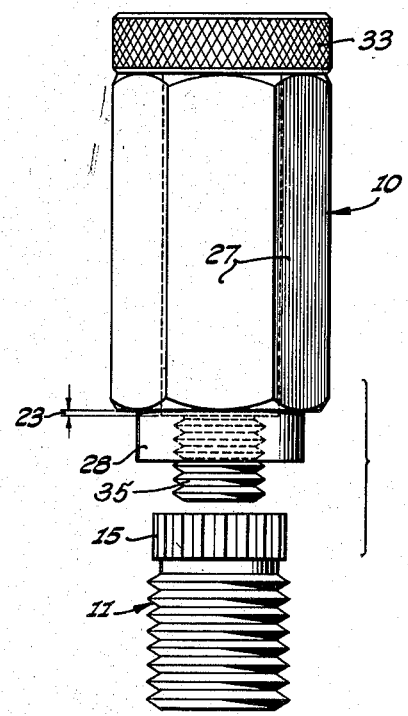
Fig. 1 is a side elevation of a tool embodying the principles of my invention.
Figure 2:
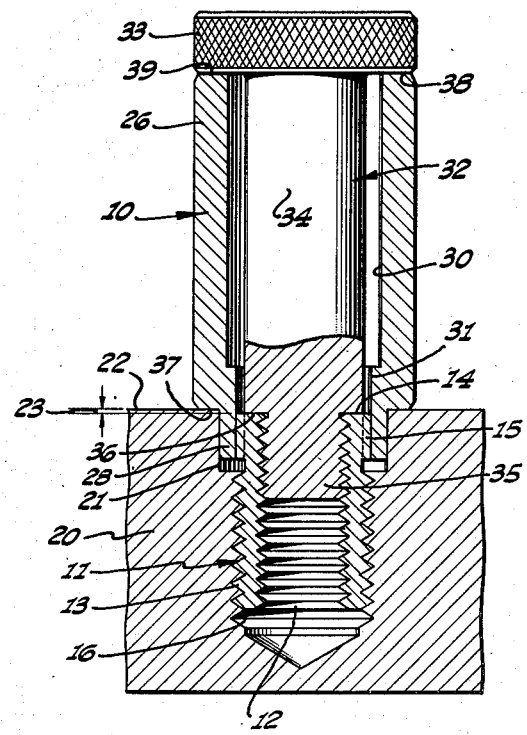
Fig. 2 is a sectional view of the same, showing the tool being used to install an insert into the parent material.

The illustrative form of the invention shown in Figs. 1 and 2 will be taken up first, and in these figures, the reference number 10 designates the tool in its entirety, while at 11 is shown an insert of the type adapted to be installed by the tool. The insert 11 is in the form of a tubular sleeve having internal threads 12 and external threads 13. The external threads 13 terminate somewhat short of the top end 14 of the insert, and formed around the outer circumference of the top end 14 is a serrated head or collar 15, the serrations of which extend axially as shown in Fig. 1.

The insert 11 is adapted to be installed into a tapped hole 16 which is formed in a body 20 of parent material. The insert 11 may be made of steel, brass, bronze, or any other suitable material, and is adapted to be installed into a tapped hole 16 in a parent body of any dissimilar material such as plastic, wood, aluminum or magnesium alloys, or other materials having physical characteristics which preclude the use of bolts or studs screwed directly into the material. The parent material is first drilled and tapped for the insert and then counterbored at 21 to a depth slightly greater than the length of the collar 15. The diameter of the counterbore 21 exceeds the maximum diameter of the serrated collar 15 sufficiently to afford ample clearance around the collar, but is made slightly less than the maximum diameter of an internally and externally serrated locking ring (not shown) so that when the latter is forced into the counterbore, the outer serrations or splines thereon broach their way into the surface of the parent material. The chips cut out of the parent material by the teeth of the locking ring fall into the lower section of the counterbore. Pressure of the surrounding material causes the locking ring to close in upon the serrated collar tightly and to take up all tolerances, making a perfectly solid and permanent unit of the two parts which are thus virtually an integral part of the parent material. The locking ring is shown in my aforementioned patent and as mentioned previously, is serrated inside and out; the inside serrations mating with the serrations on the collar 15 of the insert, while the outside serrations or splines are sharp-edged at their bottom ends to enable the ring to broach its way into the parent material.

Experience has shown that the best results are obtained when the top end 14 of the insert is installed to a depth of approximately .010" below the surface 22 of the parent material, as indicated at 23 in Fig. 2. This clearance provided by displacing the end 14 of the insert below the surface 22 is necessary to accommodate the elastic deformation of the insert under high stress, as well as the compressive yield of the parent body around the margin of the counterbore, and insures freedom at all times from interference with any part which may subsequently be drawn up tight against the parent body.

My improved tool 10 for installing the inserts to the exact depth specified comprises an elongated, hexagonal body 26 having wrench faces 27 on its outer surfaces. At the bottom end of the body 26 is an axially projecting cylindrical sleeve or annular flange 28, the outside diameter of which is slightly less than the diameter of the counterbore 21 so that it may be inserted freely down into the counterbore.

The wrench body 26 is hollow, the interior comprising an upper cylindrical bore section 30 and a lower bore section 31 of reduced diameter. The lower bore section 31 is broached out to form internal serrations which match the serrations on the collar 15 of the insert so that said collar can be received within the bore 31 and slidably moved therealong. Cooperating with the wrench body 26 is a bolt 32 having a knurled head 33 at the top end of a shank portion 34. At the bottom end of the shank portion 34 is a threaded stud 35 of reduced diameter which is adapted to be screwed into the internal threads 12 of the insert 11.

The method of using the tool 10 is as follows: A downwardly facing annular shoulder 36 is formed at the juncture of the stud 35 with the shank 34, serving as a gage stop against which the end 14 of the insert is drawn up snugly preparatory to installation. Inasmuch as the end 14 of the insert and the shoulder 36 now lie in the same plane, it is evident that the depth to which the insert is installed is determined by the position of the shoulder 36 when the installing operation has been completed. To this end, the length of the shank 34 of the bolt 32, measured from the shoulder 36 to the bottom face 38 of the knurled head 33, is made exactly .010" longer than the hexagonal portion of the wrench body 26, measured from the shoulder 37 formed at the juncture of the body 26 with the flange 28 to the top end 39 of the body. Thus, when the bolt head 33 is drawn down against the top end of the wrench body, and the shoulder 37 is in abutting relation with the surface 22 of the parent body, the shoulder 36 and top end 14 of the insert are located exactly .010" below the plane of surface 22. The serrated collar 15 of the insert is first inserted into the serrated bore 31 of the wrench body 26 and the stud 35 of the bolt 32 is then engaged in the internal threads 12 and turned until the top end 14 of the insert is drawn up tightly against the shoulder 36 formed at the junction of the shank 34 with the stud 35. The bottom end of the insert is then engaged in the tapped hole 16 in the parent body and the wrench 10 turned until the shoulder 37 formed at the junction of the sleeve 28 with the wrench body 26 is drawn up tight against the surface 22 of the parent body. The knurled head 33 of the bolt is then backed out of the insert, whereupon the wrench body 26 can be withdrawn axially from its engagement with the serrated collar 15 of the insert. The locking ring (not shown) is then led onto the serrated collar 15 and is pressed or driven in flush with either the surface 22 of the parent body or with the end 14 of the insert, broaching its way into the walls of the counterbore as it goes, as described more fully in my aforementioned patent.

From the foregoing, it will be seen that my improved tool provides an inexpensive, but at the same time, highly accurate means for installing the inserts to the exact depth desired, in the instance described, such depth being .010" below the surface.

Figure 3:
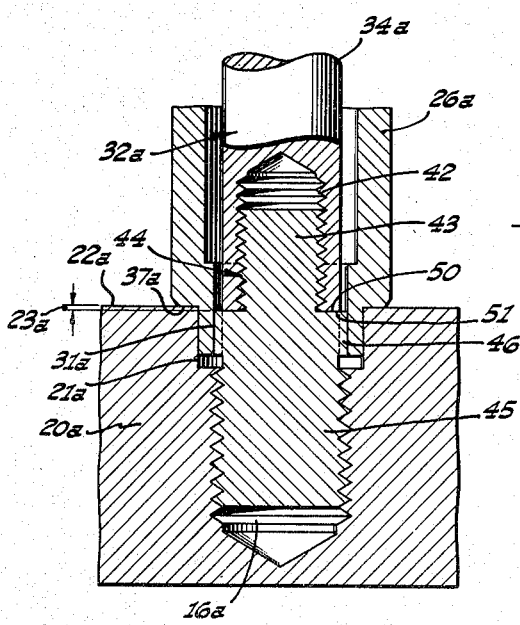
Fig. 3 is a fragmentary sectional view of a modified form of the invention for installing studs into the parent material.

Another embodiment of my invention, illustrated in Fig. 3, employs the same principles for installing studs into the parent material so that the serrated collar on the stud is recessed below the surface of the parent material to the desired depth. Parts of this embodiment which are identical to those of the previous construction have been given the same reference numerals, with suffix "a" added. In this form, the hexagonal wrench body 26a is the same as in the preceding construction, but the bolt 34a, instead of having a stud 35 at the bottom end thereof, is drilled and tapped at 42 to receive the threaded projecting end 43 of a stud 44. The bottom end portion 45 of the stud is preferably of larger diameter than the top end 43 and is threaded to fit the tapped hole 16a in the parent body. Intermediate the top and bottom portions 43, 45 is a serrated collar 46 which is adapted to receive a serrated locking ring (not shown) in the same manner as the insert collar 15. In this instance, it is desired to install the studs so that the top end 50 of the collar 46 is recessed below the surface 22a of the parent body. Accordingly, the shank 34a of the bolt is made .010" longer than the hexagonal body portion 26a of the wrench so that when the surface 59 is drawn up tight against the bottom end 51 of the bolt, and the stud is turned down into the hole 16a until the shoulder 37a is drawn up tight against the surface 22a, the top end 50 of the collar will then be recessed to the exact depth desired, namely, .010" below the level of the surface 22a. When the stud has been installed, the bolt 32a is then backed off of the top portion thereof, and the wrench body 26 is then lifted axially out of the bore 21a.

In the embodiment of my invention illustrated in Figs. 4 and 5, means are provided for adjusting the depth to which the inserts are to be installed where conditions are such as to require more or less than the standard .010" displacement, said means comprising a bushing or nut 55 having an axially extending sleeve 56 which is threaded externally at 57 and adapted to be screwed into an internally threaded portion 58 at the upper end of the bore 30b. A radial flange 60 at the top end of the bushing serves as a stop for the knurled head 33b of the bolt 32b. Thus, by turning the bushing down into the wrench body or backing the same out, it is possible to vary the effective length of the wrench body, causing a correspondingly vertical displacement of the gage shoulder 36b with respect to the surface 22b of the parent body when the insert is installed.

The bushing 55 is adapted to be secured in adjusted position by means of a countersunk set screw 62 which may be passed through any one of a plurality of angularly spaced, axially extending holes 63 provided in the flange 60, said screw being threaded into a tapped hole 64 in the top end 39b of the wrench body. In the embodiment illustrated, six holes are shown, permitting adjustment of the insert depth to any level in steps spaced apart 1/6 the lead of the thread 57, 58. Obviously, if a finer adjustment is required, more tapped holes 64 can be provided in the wrench body, said holes being spaced to give intermediate points of adjustment.

The embodiment shown in Fig. 6 illustrates still another means for securing adjustment of the depth of installation of the insert. In this instance, a nut 68 having external threads 69 is screwed into a threaded portion 70 in the bottom end of the bore 30c of the wrench body. At the bottom end of the nut 68 is an axially projecting sleeve 71 the bottom end 72 of which forms a gage shoulder against which the top end 14c of the insert is drawn. The nut 68 is drilled or bored centrally at 73 to pass the shank 34c of the bolt. In this case, however, the bolt shank is not shouldered at the junction with the threaded stud portions 35c, since such shoulder is already provided by the bottom end 72 of the nut 68, but instead is provided with a thread relief 74 extending up from the end of the threads to a point slightly above the shoulder 72 whereby to insure against interference of the bolt shank with the insert when the latter is drawn up against the shoulder. Either end of the nut 68 may be slotted or otherwise formed to receive a wrench or screwdriver, for instance as indicated at 68a, by means of which the nut can be turned to any adjusted position. The nut 68 is secured in adjusted position by a set screw 75 which is screwed into a tapped hole 76 in the side of the wrench body and presses a pellet 77 of lead or other soft material against the threads 69, said pellet conforming to the thread contour and applying the pressure of the set screw 75 against the same without damage thereto.

It is believed that the method of operation of my improved wrench and the advantageous features thereof are clearly evident from the foregoing description and a further discussion of the same is not deemed necessary at this point. While I have shown and described in considerable detail what I believe to be the preferred forms of my invention, it is to be understood that such detailed description is not restrictive in any sense, but that various changes in the shape and arrangement of the several parts may be made without departing from the broad framework of the invention as defined in the appended claims.

I claim:

1. A tool for installing inserts of the type having a threaded portion adapted to be screwed into a tapped hole in a surface of a parent body, and a collar having external locking formations thereon, said tool comprising a gage stop engageable with the outer end of said insert, means engageable with said insert to draw the same against said gage stop, shoulder means on said tool engageable with the said surface of said parent body when the insert is fully inserted, said shoulder means and said gage stop being spaced apart longitudinally a predetermined distance whereby the top end of said collar is positioned said predetermined distance from the plane of said surface when said shoulder means is abutting said surface, and means on said tool whereby a torsional force can be applied to said insert to turn the same down into said tapped hole.

2. A tool for installing inserts of the type having a first threaded portion adapted to be screwed into a tapped hole in a surface of a parent body, a second threaded portion adapted to receive a complementary fastening element, and a collar having longitudinally extending serrations thereon, said tool comprising threaded means engageable with said second threaded portion of the insert, a gage stop engageable with the top end of said insert, a serrated socket on said tool engageable with the serrations on said collar to hold the insert against turning with respect thereto, shoulder means on said tool engageable with said surface of said parent body when the insert is fully inserted, said shoulder means and said gage stop being spaced apart longitudinally a predetermined distance whereby the top end of said collar is positioned said predetermined distance from the plane of said surface when said shoulder means is abutting said surface, and means on said tool whereby a torsional force can be applied to said insert to turn the same down into said tapped hole.

3. A tool for installing inserts of the type having a first threaded portion adapted to be screwed into a tapped hole in a surface of a parent body, a second threaded portion adapted to receive a complementary fastening element, and a collar having longtiudinally extending serrations thereon, said tool comprising a hollow body having an opening in the bottom end thereof adapted to receive said collar, a bolt member extending centrally through said body and having threaded means at the bottom end thereof engageable with said second threaded portion of the insert, said bolt being engageable with the top end of said hollow body to limit axial travel thereof with respect to the body, a gage stop engageable with the top end of said insert, shoulder means at the bottom end of said body engageable with the surface of said parent body when the insert is fully inserted, said shoulder means and said gage stop being spaced apart longitudinally a predetermined distance whereby the top end of said collar is positioned said predetermined distance from the plane of said surface when said shoulder means is abutting said surface, and means on said tool whereby a torsional force can be applied to said insert to turn the same down into said tapped hole.

4. A tool for installing tubular inserts of the type having external threads adapted to be screwed into a tapped hole in a surface of a parent body, internal threads adapted to receive a screw member, and a serrated collar at the top end thereof, said tool comprising a body having a serrated opening in the bottom end thereof adapted to receive said collar and coact with the serrations thereon to hold said insert against relative turning, a gage stop engageable with the end of said insert, means engageable with said internal threads of the insert to draw the same against said gage stop, shoulder means on said tool engageable with the surface of said parent body when the insert is fully inserted, said shoulder means and said gage stop being spaced apart longitudinally a predetermined distance whereby the top end of said collar is positioned said predetermined distance from the plane of said surface when said shoulder means is abutting said surface, and means on said tool whereby a torsional force can be applied to said insert to turn the same down into said tapped hole.

5. A tool for installing inserts of the type having a threaded portion adapted to be screwed into a tapped hole in a surface of a parent body, and a collar having locking formations thereon, said tool comprising a body having shoulder means engageable with the surface of said parent body when the insert is fully installed, a gage stop engageable with the outer end of said insert, means engageable with said insert to draw the same against said gage stop, means for varying the distance between said shoulder means and said gage stop whereby the top end of said collar may be positioned at any desired level with respect to said surface when said shoulder means is abutting the surface, and means on said tool whereby a torsional force can be applied to said insert to turn the same down into said tapped hole.

6. A tool for installing inserts of the type having a first threaded portion adapted to be screwed into a tapped hole in a surface of a parent body, a second threaded portion adapted to receive a complementary fastening element, and a collar having longitudinally extending serrations thereon, said tool comprising a hollow body having an opening in the bottom end thereof adapted to receive said collar, a bolt member extending centrally through said hollow body and having threaded means at the bottom end thereof engageable with said second threaded portions of the insert, said bolt member having a gage stop shoulder against which said insert is drawn, a shoulder at the bottom end of said hollow body engageable with the surface of said parent body when the insert is fully inserted, and means adjustable longitudinally with respect to said hollow body and engageable by said bolt member to locate said gage stop shoulder and abutting insert at a predetermined level with respect to said surface.

7. A tool for installing inserts of the type having a first threaded portion adapted to be screwed into a tapped hole in a surface of a parent body, a second threaded portion adapted to receive a complementary fastening element, and a collar having longitudinally extending serrations thereon, said tool comprising a hollow body having an opening in the bottom end thereof adapted to receive said collar, a bolt member extending centrally through said hollow body and having threaded means at the bottom end thereof engageable with said second threaded portion of the insert, said bolt member having a gage stop shoulder against which said insert is drawn, a shoulder at the bottom end of said hollow body engageable with the surface of said parent body when the insert is fully inserted, a bushing member threaded into the upper end of said hollow body and adjustable longitudinally with respect thereto, said bolt member passing through said bushing member and engaging the top end thereof to locate said gage stop shoulder and abutting insert at a predetermined level with respect to said surface.

8. A tool for installing inserts of the type having a first threaded portion adapted to be screwed into a tapped hole in a surface of a parent body, a second threaded portion adapted to receive a complementary fastening element, and a collar having longitudinally extending serrations thereon, said tool comprising a hollow body having an opening in the bottom end thereof adapted to receive said collar, a bolt member extending centrally through said hollow body and having threaded means at the bottom end thereof engageable with said second threaded portion of the insert, a shoulder at the bottom end of said hollow body engageable with the surface of said parent body when the insert is fully in place, and means adjustable longitudinally with respect to said hollow body and engageable by said insert when the latter is drawn up by said bolt member to locate the insert at a predetermined level with respect to said surface.

9. A tool for installing inserts of the type having a first threaded portion adapted to be screwed into a tapped hole in a surface of a parent body, a second threaded portion adapted to receive a complementary fastening element, and a collar having longitudinally extending serrations thereon, said tool comprising a hollow body having an opening in the bottom end thereof adapted to receive said collar, a bolt member extending centrally through said hollow body and having threaded means at the bottom end thereof engageable with said second threaded portion of the insert, a shoulder at the bottom end of said hollow body engageable with the surface of said parent body when the insert is fully in place, and a nut disposed within the interior of said hollow body and having threaded engagement therewith, said nut being movable longitudinally with respect to said body and having a gage shoulder thereon engageable by the end of said insert when the latter is drawn up by said bolt member, said gage shoulder determining the location of the end of said insert with respect to said surface.

JOSEPH ROSAN.

REFERENCES CITED

The following references are of record in the file of this patent:

UNITED STATES PATENTS

| Number | Name | Date |
| --- | --- | --- |
| 2,103,944 | Gullborg | Dec. 28, 1937 |

FOREIGN PATENTS

| Number | Country | Date |
| --- | --- | --- |
| 418,760 | Great Britain | Oct. 31, 1934 |